United States Patent Office 3,547,869
Patented Dec. 15, 1970

---

3,547,869
PLASTICISED CURABLE MIXTURES OF POLYEPOXIDES AND POLYEPOXIDEPOLYAMINE ADDUCTS
Eberhard Seeber, Arlesheim, and Alfred Heer, Birsfelden, Switzerland, assignors to Ciba Limited, Basel, Switzerland, a company of Switzerland
No Drawing. Filed Apr. 22, 1969, Ser. No. 818,436
Claims priority, application Switzerland, May 3, 1968, 6,559/68
Int. Cl. C08g 51/26
U.S. Cl. 260—30.4           10 Claims

ABSTRACT OF THE DISCLOSURE

New, plasticized, curable mixtures containing (1) a polyglycidyl ether of a polyphenol, (2) as plasticizing component, a diglycidyl ether or ester of a polyethylene glycol or polypropylene glycol having an average molecular weight of at least 300 and at most 1100, for example diglycidyl ether of a polypropylene glycol having an average molecular weight of 425, or diglycidyl ester of a dicarboxylic acid obtained by reacting 2 mols of phthalic anhydride with 1 mol of polypropylene glycol having an average molecular weight of 425, and (3) a solvent-free adduct curing agent formed from (a) a polyglycidyl ether, which is liquid at room temperature, of a polyphenol, and (b) hexamethylene diamine or a mixture of hexamethylene diamine and a hexamethylene diamine or heptamethylene diamine alkyl-substituted in the polymethylene chain, there being used for the formation of the adduct a ratio of 3 to 12, preferably about 5, amino group equivalents of the diamine or the diamine mixture for every epoxide group equivalent of the polyglycidyl ether (a).

---

The subject of the present invention is new plasticised curable mixtures which are suitable for the manufacture of shaped articles, impregnations, coatings and adhesive bonds and which are characterised in that they contain (a) a polyglycidyl ether of a polyphenol, (b) as the plasticising component, a diglycidyl ether or diglycidyl ester of formula

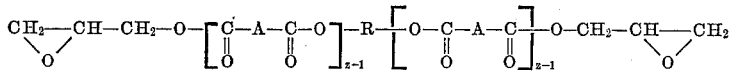

(I)

wherein R denotes the residue, obtained by removing the hydroxyl groups, of a polyethylene glycol or polypropylene glycol of average molecular weight of at least 300 and at most 1100, A represents a phenylene residue which is either unsubstitued or substituted by halogen atoms and z is an integer having a value of 1 or 2, and (c) as the curing agent, a solvent-free adduct which is liquid at room temperature, from (1) a polyglycidyl ether, which is

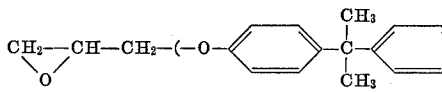

liquid at room temperature, of a polyphenol and (2) hexamethylenediamine or a mixture of hexamethylenediamine and a hexamethylenediamine or heptamethylenediamine which is alkyl-substituted in the polymethylene chain, with a proportion of 3 to 12, preferably about 5, amine group equivalents of the diamine or of the diamine mixture (2) having been employed per 1 epoxide group equivalent of the polyglycidyl ether (1) for the formation of the adduct mentioned.

As component (a) it is possible to use the known diglycidyl or polyglycidyl ethers, which are liquid or solid and fusible at room temperature, of polyhydric phenols such as resorcinol, bis-(p-hydroxyphenyl)-methane,2,2 - bis-(p-hydroxyphenyl)propane (=diomethane or bisphenol A), 2,2 - bis(4'-hydroxy-3',5'-dibromophenyl)-propane, 1,1,2,2 - tetrakis - (p - hydroxylphenyl)-ethane or condensation products of phenols with formaldehyde obtained under acid conditions, such as phenol novolacs and cresol novolacs.

Particularly suitable components (a) are the polyglycidyl ethers of bisphenol A which are solid at room temperature and have an epoxide equivalent weight of 250–2000.

Possible plasticising components (b) are firstly diglycidyl ethers of polyethylene glycols or polypropylene glycols of average molecular weight 300–1100, for example polypropylene glycol of average molecular weight 1025 or polypropylene glycol of average molecular weight 425.

Further possible plasticising components are the diglycidyl esters of dicarboxylic acids of formula

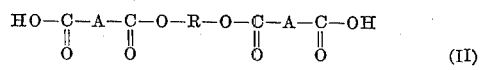

(II)

wherein the residues R and A have the same significance as in Formula I. Such dicarboxylic acids can for example be manufactured according to known processes by reaction of 2 mols of phthalic anhydride or tetrachlorophthalic anhydride with 1 mol of a polyethylene glycol or polypropylene glycol of average molecular weight 300–1100. No cover is here claimed for the diglycidyl esters of these dicarboxylic acids (II), which have hitherto not been previously described in the literature.

The adduct curing agents (c) are manufactured by reacting (1) a polyglycidyl ether of a polyphenol, which is liquid at room temperature with (2) hexamethylenediamine or a mixture of hexamethylenediamine and a hexamethylenediamine or heptamethylenediamine which is alkyl-substituted in the polymethylene chain, in a proportion of 3 to 12, preferably about 5, amino group equivalents of the diamine (2) per 1 epoxide group equivalent of the polyglycidyl ether (1) in the absence of solvents, with warming. The polyglycidyl ethers which are liquid at room temperature, that is to say 25° C., can be derived from polyphenols such as resorcinol, phenolformaldehyde condensation products of the type of the cresols or novolacs, bis-(p-hydroxyphenyl)-methane and especially 2,2 - bis-(p-hydroxyphenyl)propane (=diomethane or bisphenol A).

Compounds to be especially mentioned here are the polyglycidyl ethers of diomethane which are liquid at room temperature, have an epoxide content of 3.8–5.8 epoxide equivalents/kg. and correspond to the average formula:

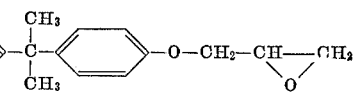

wherein n denotes a number having a value of 0 to 0.65.

To form an adduct with the above-mentioned liquid polyglycidyl ethers of polyphenols there are used, in addition to hexamethylenediamine alone, also its mixtures with a hexamethylenediamine or heptamethylenediamine which is alkyl-substituted in the polymethylene chain, such as for example 1,6-diamino-2,2,4-trimethylhexane, 1,6 - diamino - 2,4,4-trimethylhexane and the industrial mixtures of these two isomers, and also 2-methyl-hexamethylenediamine, 3 - methyl - hexamethylenediamine; 2,3-, 2,4-, 2,5- and 3,4-dimethylhexamethylenediamine and 1,7 - diamino - 4,4 - dimethylheptane. The polyamine which is alkyl-substituted in the polymethylene chain can also only be added to the adduct after its formation from hexamethylenediamnie and polyglycidyl ether.

The adduct curing agents (c) manufactured in this way are liquid at room temperature and do not tend to crystallise even at temperatures of about 0° C. No cover is here claimed for these adducts which have hitherto not been previously described in the literature.

The adduct (c) is appropriately used in an approximately equivalent amount (that is to say 1 equivalent of amine hydrogen atoms of the adduct curing agent per 1 epoxide group equivalent of the mixture of the glycidyl components (a) and (b)).

Advantageously, a phenol or polyphenol, such as for example diomethane, can be added as a cure accelerator to the adduct curing agent in any phase of its manufacture, and 0 to 20% of a high-boiling liquid diluent such as for example dibutyl phthalate or polypropylene glycol of average molecular weight 300 to 1100 can be added to lower the viscosity.

The curable mixtures according to the invention can furthermore, before cure, be mixed at any stage with the usual modifiers such as extenders, fillers and reinforcing agents, pigments, dyestuffs, flow control agents, agents for conferring thixotropy, flameproofing substances or mould release agents.

As extenders, reinforcing agents, fillers and pigments which can be employed in the curable mixtures according to the invention there may for example be mentioned: glass fibres, boro fibres, cellulose, polyethylene powder, polypropylene powder, mica, asbestos, quartz powder, slate powder, hydrated aluminium trioxide, chalk powder, gypsum, antimony trioxide, bentones, silica aerogel ("Aerosil"), lithopone, barite, titanium dioxide, carbon black, graphite, iron oxide or metal powder such as aluminium powder or iron powder.

The term "cure" as used here denotes the conversion of the above mixtures into insoluble and infusible cross-linked products, and in fact as a rule with simultaneous shaping. At the same time the curable mixtures according to the invention are above all suitable for use as sealers, as sealing compositions or as joint filling materials, which after cure must be able to withstand blows and knocks and to neutralise the forces thus generated by reversible deformation. They are suitable for the manufacture for insulations against seepage water and pressure water in constructing shafts and tunnels, but also for coatings, floor coverings, castings, sound-insulating or sound-damping coatings or vibration-damping supports.

In the examples which follow, unless otherwise stated, the parts denote parts by weight and the percentages denote percentages by weight. The relationship of the parts by volume to the parts by weight is as of a millilitre to a gram.

The test methods employed in the examples which follow are specified below.

The modulus of elasticity, subsequently referred to as E-modulus for brevity, was determined according to DIN 53571 on 7 day old shoulder specimens, shape A, in a tensile test. In order to determine the E-modulus the samples were loaded in stages. The extension of a measuring distance of about 20 mm. which had beforehand been drawn in and measured, was measured every 2 minutes after reaching the load stage, using a travelling microscope (accuracy of reading 1/100 mm.). The E-modulus was calculated from the difference in tension between two load stages $\sigma_1$ and $\sigma_2$ and the difference in elongation $\epsilon_2 - \epsilon_1$ corresponding to the difference in tension, using $$E = \frac{\sigma_2 - \sigma_1}{\epsilon_2 - \epsilon_1}$$

The tensile strength was determined according to DIN 53571 using specimens of shape A, in a mechanical tensile testing machine in the 20 kp. range, with a speed of travel of 20 mm./minute.

In order to determine the elongation at break, again according to DIN 53571, using specimens of shape A, a test was additionally carried out at speeds of travel of 80 and 300 mm./minute.

The depth of impression (boss impression) was determined on circular 4 mm. thick sheet specimens by a test derived from DIN 51955. Deviating from the test standard specification, the load weight was varied between 10 and 50 kp. A cylinder of 11.3 mm. diameter (=1 cm.²) with a plane base surface and broken edges was used as the impression boss.

In the case of the water absorption, 4 mm. thick sheets of size 10 x 10 cm. were stored in tap water and the water absorption was determined gravimetrically.

The water vapour permeability was determined according to DIN 53122 (preliminary standard specification, April 1961) using circular 4 mm. thick sheets of 9 cm. diameter. Finely granular calcium chloride served as the absorbent. The relative atmospheric humidity of 85±2% was established in the vapourisation chamber by means of a saturated potassium chloride solution. The experiments ran for 44 days. The mean water vapour permeability is specified in g./m.²×$d$ (days).

The behaviour towards pressure water was determined as follows: the experiments were carried out on 4 mm. thick sheets using a water pressure of 20 kp./cm.². For the test, one sheet specimen at a time, of diameter about 20 cm., was clamped centrally between 2 steel plates (external diameter 30 cm.). The circular test area exposed to the water pressure had a diameter of 100 mm. (=78.5 cm.² test area).

A 5 mm. thick circular disc of pine wood, again of 100 mm. diameter, which had been climatically conditioned in standard climatic conditions DIN 50014 (20±1° C. and 65±5% relative humidity) was inserted into the recess of the lower steel plate under the sheet area subjected to the water pressure. As a result of the hygroscopic properties of the wood this disc can absorb the water which may have penetrated through the sheet.

The amount of water which has penetrated through the sheet can be determined by weighing the pine wood disc before and after the test.

The following epoxide resins were used for the manufacture of plasticised curable epoxide resin mixtures described in the examples:

EPOXIDE RESIN A

Solid diomethane polyglycidyl ether manufactured by condensation of epichlorhydrin with diomethane (2,2-bis-(p-hydroxyphenyl)-propane) in the presence of alkali, having the following characteristics:
epoxide content: 2.0–2.5 epoxide equivalents/kg.
softening point (Durran): 60–65° C.

EPOXIDE RESIN B

Polyglycidyl ether resin manufactured by a condensation of a stoichiometric excess of epichlorhydrin with diomethane in the presence of alkali, consisting mainly of diomethane diglycidyl ether and liquid at room temperature, having the following characteristics:
epoxide content: 5.3 epoxide equivalents/kg.
viscosity at 25° C.: 10,000 cp.

EPOXIDE RESIN C (PLASTICISER)

Diglycidyl ether of a polypropylene glycol of average molecular weight 425, having the following characteristics:
epoxide content: 2.26 epoxide equivalents/kg.
viscosity at 25° C.: about 160 cp.

EPOXIDE RESIN D (PLASTICISER)

Diglycidyl ester of the condensation product of 2 mols of phthalic anhydride and 1 mol of polypropylene glycol of average molecular weight 425, having the following characteristics:

epoxide content: 2.3 epoxide equivalents/kg.
viscosity at 25° C.: 3000 cp.

Epoxide resin D can be manufactured as follows:

(a) Manufacture of the half-ester 593 g. (4 mols) of phthalic anhydride and 850 g. of polypropylene glycol of mean molecular weight 425 are initially introduced into a suitable reaction vessel and warmed to 130° C. whilst stirring. A slight exothermic reaction starts. After 3 hours at 115–120° C. the mixture is cooled to 90° C. and a sample is triturated to determine the acid content. The trituration showed 2.6 equivalents/kg. of free carboxyl groups (theory 2.77 equivalents/kg.) and 0.2 mol/kg. of unchanged phthalic anhydride.

(b) The intermediate product is mixed with 2220 g. (24 mols) of epichlorhydrin in the same reaction vessel and the temperature is kept at 90° C. 20 g. of a 50% strength aqueous solution of tetramethylammonium chloride are introduced and this initiates an exothermic but easily controllable reaction. The temperature is kept between 88 and 92° C. The course of the reaction is monitored with the aid of a pH-electrode. The pH measuring equipment initially shows a pH-value of 3.5–4.5 which rises slowly and is about 7 after 20 minutes. After 20 to 25 minutes an abrupt rise in the pH-value occurs which indicates the end of the reaction. The pH-electrode is removed and a dropping funnel with 400 g. (5 mols= 125% of the theoretical amount) of aqueous 50% strength sodium hydroxide solution is attached. The reaction mixture is cooled to 50–60° C. and a further 20 g. of aqueous 50% strength tetramethylammonium chloride solution are added. The apparatus is subjected to vacuum. The sodium hydroxide solution is allowed to run in continuously over the course of 80 to 120 minutes at a vacuum of 70–100 mm. Hg and an internal temperature of 52–58° C., in the course of which the water introduced and the water formed are distilled off azeotropically with epichlorhydrin. The epichlorhydrin separated from the water in a water separator is continuously returned to the reaction mixture. About 300 ml. of water are separated off. For working up, air is admitted into the apparatus and the reaction mixture is successively washed in a separating funnel with 1000 ml. of water, with 700 ml. of aqueous 5% strength monosodium phosphate solution and with 700 ml. of water. The epichlorhydrin solution is concentrated in vacuo (water pump) in a rotational evaporator. The residue is dried for 45 minutes at 120° C. and a vacuum of 1–2 mm. Hg and is then filtered through a pressure filter using filter paper.

1600 g. (96% of theory) of a yellow clear liquid noncrystallising product are obtained, giving the following analytical value:

viscosity (at 25° C.): 3000 cp. (Hoeppler viscometer)
epoxide content: 2.30 epoxide equivalents/kg. (95.6% of theory)
chlorine content: 0.6% (according to Wurzschmitt).

The product consists mainly of the diglycidyl ester of formula

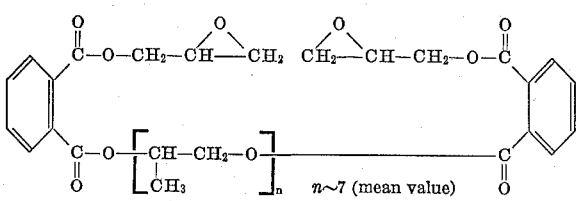

Manufacture of amine adduct curing agent A (contains diomethane as accelerator).

94 parts by weight of a diomethane diglycidyl ether manufactured by condensation of epichlorhydrin with diomethane in the presence of alkali, which is liquid at room temperature and has an epoxide content of 5.4 epoxide equivalents/kg. and a viscosity of about 9000 cp. at 25° C. are introduced over the course of 60 minutes into a homogeneous melt of 164 parts by weight of hexamethylenediamine and 95 parts by weight of diomethane (=2,2-bis(p - hydroxyphenyl) - propane) at 80–90° C. After a further 30 minutes stirring at 110 to 120° C. 44 parts by weight of trimethylhexamethylenediamine (isomer mixture of 1,6-diamino-2,2,4-trimethylhexane and 1,6-diamino-2,4,4-trimethylhexane) are introduced. 397 parts of liquid noncrystallising adduct containing free diomethane as an accelerator (=amine adduct curing agent A), having a viscosity of about 3400 cp. at 25° C., are obtained as the product.

Example 1.—A homogeneous mixture is manufactured at 70–80° C. from 35 parts of epoxide resin A (solid diomethane polyglycidyl ether having an epoxide content of 2.0–2.5 epoxide equivalents per kg.) and 65 parts of epoxide resin C (liquid diglycidyl ether of polypropylene glycol 425 having an epoxide content of 2.26 epoxide equivalents/kg). 15 parts of the amine adduct curing agent A described above and containing diomethane as an accelerator are added at room temperature to 100 parts of this mixture. The resulting resin/curing agent mixture is cast in aluminium moulds and cured for 24 hours at 25° C.

Clear highly elastic castings are obtained, having the following properties:

E-modulus: 43.5 kp./cm.$^2$
elongation at break: 45%
tensile strength: 10 kp./cm.$^2$
Pressure water test on 4 mm. thick sheets at 20 kp./cm.$^2$ water pressure: leakproof.

If the cure is effected at +5° C., the cure time increases to 48 hours.

Example 2.—20.5 parts of asbestos powder are incorporated into 100 parts of the epoxide resin mixture of 35 parts of epoxide resin A and 65 parts of epoxide resin C (plasticiser) described in Example 1, and the mixture was homogenised in an intensive mixer. After adding 15 parts of amine adduct curing agent A as described in Example 1, the resin/curing agent mixture is introduced into aluminium moulds. The mass is fully cured at 25° C. after 24 hours and at 5° C. after 48 hours. After 7 days storage, castings having the following final properties are obtained:

E-modulus: 36.0 kp./cm.$^2$
tensile strength: 18 kp./cm.$^2$
elongation at break: 37%
boss impression up to damage: 20 kp./cm.$^2$
residual depth of impression after 24 hours load and subsequent release of load: 0 mm.
water absorption after 170 days: about 4%
water vapour permeability: 1.03 g./m.$^2$×day
pressure water test on 4 mm. thick sheets at 20 kp./cm.$^2$: leakproof to pressure water.

Example 3.—60 parts of asbestos powder and 2.0 parts of silica aerogel (registered trade name "Aerosil") are worked into 100 parts of the epoxide resin mixture of 35 parts of epoxide resin A and 65 parts of epoxide resin C (plasticiser) described in Example 1, and the mixture is homogenised in an intensive mixer.

After adding 15 parts of amine adduct curing agent A as described in Example 1, the resin/curing agent mixture is introduced into aluminium moulds. The mass is fully cured at 25° C. in 24 hours and at 5° C. in 48 hours. After 7 days storage, castings having the following final properties are obtained:

tensile strength: 29 kp./cm.$^2$
elongation at break: 28%
E-modulus: 91 kp./cm.$^2$
boss impression up to damage: 30 kp./cm.$^2$ residual depth of impression after 24 hours load and subsequent release of load: 0 mm.
water absorption after 170 days: about 3%
water vapour permeability: 0.75 g./m.$^2$×day
pressure water test on 4 mm. thick sheets at 20 kp./cm.$^2$: leakproof to pressure water.

Example 4.—A homogeneous mixture is manufactured from 35 parts of epoxide resin B (liquid diomethane diglycidyl ether having an epoxide content of 5.3 epoxide equivalents per kg. and a viscosity at 25° C. about 10,000 cp.) and 65 parts of epoxide resin C (liquid diglycidyl ether of polypropylene glycol 425 having an epoxide content of 2.26 epoxide equivalents/kg.) at 70–80° C. whilst stirring. 23 parts of the amine adduct curing agent A described above are added to 100 parts of this mixture at room temperature. The resin/curing agent mixture is cast into aluminium moulds. The cure time is 24 hours at 25° C. and 48 hours at 5° C. After 7 days storage, clear highly elastic castings are obtained, having the following final properties:

E-modulus: 30 kp./cm.$^2$
elongation at break: 52%
tensile strength: 16 kp./cm.$^2$
water absorption after 12 weeks: 4.9%
water vapour permeability: 1.2 g./m.$^2$×day.

Example 5.—A homogeneous mixture is manufactured from 20 parts of epoxide resin B (liquid diomethane diglycidyl ether having an epoxide content of 5.3 epoxide equivalents/kg. and a viscosity of about 10,000 cp. at 25° C.) and 80 parts of epoxide resin D (liquid diglycidyl ester of the condensation product of 2 mols of phthalic anhydride and 1 mol of polypropylene glycol 425, having an epoxide content of 2.3 epoxide equivalents/kg.) at 70–80° C. whilst stirring.

20 parts of the amine adduct curing agent A described above are added at room temperature to 100 parts of this mixture. The resin/curing agent mixture is cast into aluminium moulds. The cure time is 24 hours at 25° C. At 5° C. the cure time increases to 48 hours. Highly elastic castings having the following final properties are obtained after 7 days storage:

E-modulus: 18 kp./cm.$^2$
elongation at break: 128%
tensile strength: 23 kp./cm.$^2$
water absorption after 12 weeks: 4.2%
water vapour permeability: 0.65 g./m.$^2$×day.

We claim:
1. A plasticised curable composition of matter which comprises (a) a polyglycidyl ether of a polyphenol, (b) as the plasticizer, a diglycidyl ether or diglycidyl ester of formula

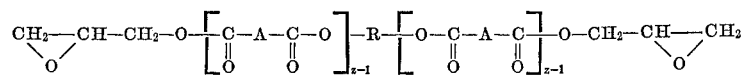

(I)

wherein R denotes the radical which is obtained by removing the hydroxyl groups from a polyethylene glycol or polypropylene glycol of average molecular weight of at least 300 and at most 1100, A represents unsubstituted or halogen substituted phenylene and z is an integer of at least 1 and at most 2, and (c) as the curing agent, a solvent-free adduct which is liquid at room temperature, said adduct being formed from (1) a polyglycidyl ether of a polyphenol, said ether being liquid at room temperature, and from (2) hexamethylenediamine or a mixture of hexamethylenediamine and of a hexamethylenediamine or heptamethylenediamine which is alkyl-substituted in the polymethylene chain, with the proviso that 3 to 12 amine group equivalents of the diamine or of the diamine mixture (2) must be employed per 1 epoxide group equivalent of the polyglycidyl ether (1).

2. A plasticised curable composition of matter which comprises (a) a polyglycidyl ether of a polyphenol, (b) as the plasticizer, a diglycidyl ether or diglycidyl ester of formula

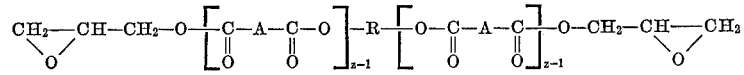

(I)

wherein R denotes the radical which is obtained by removing the hydroxyl groups from a polyethylene glycol or polypropylene glycol or average molecular weight of at least 300 and at most 1100, A represents unsubstituted or halogen substituted phenylene and z is an integer of at least 1 and at most 2, and (c) as the curing agent, a solvent-free adduct which is liquid at room temperature, said adduct being formed from (1) a polyglycidyl ether of a polyphenol, said ether being liquid at room temperature, and from (2) hexamethylenediamine or a mixture of hexamethylenediamine and of a hexamethylenediamine or heptamethylenediamine which is alkyl-substituted in the polymethylene chain, with the proviso that about 5 amine group equivalents of the diamine or of the diamine mixture (2) must be employed per 1 epoxide group equivalent of the polyglycidyl ether (1).

3. A curable composition as claimed in claim 1 which contains as component (a) a polyglycidyl ether of 2,2-bis(p-hydroxyphenyl)-propane which is solid at room temperature and has an epoxide equivalent weight of 250–2000.

4. A curable composition as claimed in claim 1 which contains as component (b) the diglycidyl ether of a polypropylene glycol of average molecular weight 425.

5. A curable composition as claimed in claim 1 which contains as component (b) the diglycidyl ester of a dicarboxylic acid which is formed by reaction of 2 mols of phthalic anhydride with 1 mol of polypropylene glycol of average molecular weight 425.

6. A curable composition as claimed in claim 1 which contains as component (c) an adduct formed from a polyglycidyl ether of 2,2-bis(p-hydroxyphenyl)-propane which is liquid at room temperature, and from hexamethylenediamine.

7. A curable composition as claimed in claim 1, wherein component (c) subsequent to the adduct formation has been diluted with a mixture of 1,6-diamino-2,2,4-trimethylhexane and 1,6-diamino-2,4,4-trimethylhexane.

8. A curable composition as claimed in claim 1 which contains as component (c), an adduct from a polyglycidyl ether of 2,2-bis(p-hydroxyphenyl)-propane which is liquid at room temperature and from the mixture of hexamethylenediamine, 1,6-diamino-2,2,4-trimethylhexane and 1,6-diamino-2,4,4-trimethylhexane.

9. A curable composition as claimed in claim 1 which in addition contains a monophenol or polyphenol as cure accelerators.

10. A curable composition as claimed in claim 9, which contains 2,2-bis(p-hydroxyphenyl)-propane as cure accelerator.

References Cited

UNITED STATES PATENTS 3,865,888  12/1958  Greenlee _____ 260—47(EpCN)
2,909,448  10/1959  Schroeder ___ 260—47(EpCN)X
3,449,278   6/1969  McKay et al. __ 260—830(TW)X MORRIS LIEBMAN, Primary Examiner L. T. JACOBS, Assistant Examiner